United States Patent
Zhang

(10) Patent No.: US 11,736,752 B2
(45) Date of Patent: Aug. 22, 2023

(54) METHOD FOR DISPLAYING VIEW HISTORY AND DISPLAY APPARATUS

(71) Applicant: QINGDAO HISENSE MEDIA NETWORKS LTD., Shandong (CN)

(72) Inventor: Xin Zhang, Shandong (CN)

(73) Assignee: QINGDAO HISENSE MEDIA NETWORKS LTD., Shandong (CN)

( * ) Notice: Subject to any disclaimer, the term of this patent is extended or adjusted under 35 U.S.C. 154(b) by 0 days.

(21) Appl. No.: 17/809,093

(22) Filed: Jun. 27, 2022

(65) Prior Publication Data
US 2022/0329895 A1 Oct. 13, 2022

Related U.S. Application Data

(63) Continuation of application No. PCT/CN2020/089177, filed on May 8, 2020.

(30) Foreign Application Priority Data

Mar. 2, 2020 (CN) .......................... 202010136578.5

(51) Int. Cl.
*H04N 21/258* (2011.01)
*H04N 21/25* (2011.01)

(52) U.S. Cl.
CPC ..... *H04N 21/25891* (2013.01); *H04N 21/251* (2013.01); *H04N 21/25875* (2013.01)

(58) Field of Classification Search
CPC ........... H04N 21/25891; H04N 21/251; H04N 21/25875
See application file for complete search history.

(56) References Cited

U.S. PATENT DOCUMENTS 9,715,482 B1 * 7/2017 Bjorkegren ......... G06F 3/04855
10,445,304 B1 * 10/2019 Thompson ............ H04L 67/535
(Continued)

FOREIGN PATENT DOCUMENTS

CN 103475939 A 12/2013
CN 103546774 A 1/2014
(Continued)

OTHER PUBLICATIONS

International Search Report, CNIPA International Search Authority, dated Dec. 3, 2020, from PCT/CN2020/089177 filed May 8, 2020.

*Primary Examiner* — Nnenna N Ekpo
(74) *Attorney, Agent, or Firm* — Workman Nydegger

(57) ABSTRACT

The disclosure provides a display apparatus including a controller and a method for displaying view history in the display apparatus. The controller is configured to cause the display apparatus to perform: after logging in to a cloud account on the display apparatus, in response to a command for watching a first video item on the display of the display apparatus, generating a first view history record corresponding to the first video item; sending the first view history record to a server; inserting the first view history record into a first place of a second history information list; in response to receiving a command for displaying a view history interface, sending a request for view history to the server; in response to receiving first history information list, displaying preset images of first view history records included in the received first history information list on the view history interface.

18 Claims, 11 Drawing Sheets

(56) References Cited

U.S. PATENT DOCUMENTS

| | | | |
|---|---|---|---|
| 2012/0210225 A1* | 8/2012 | McCoy | G06F 3/0487 715/719 |
| 2014/0366065 A1* | 12/2014 | Hattori | H04N 21/4751 725/45 |
| 2016/0066048 A1 | 3/2016 | Ashbrook et al. | |
| 2016/0085500 A1 | 3/2016 | Corbin et al. | |

FOREIGN PATENT DOCUMENTS

| CN | 103607461 A | 2/2014 |
|---|---|---|
| CN | 104484165 A | 4/2015 |
| CN | 104822090 A | 8/2015 |
| CN | 108282673 A | 7/2018 |
| CN | 109348263 A | 2/2019 |
| CN | 109479160 A | 3/2019 |

* cited by examiner

METHOD FOR DISPLAYING VIEW HISTORY AND DISPLAY APPARATUS

This application is a continuation application of International Application No. PCT/CN2020/089177, filed on May 8, 2020, which claims priority to Chinese Patent Application No. 202010136578.5, filed on Mar. 2, 2020, which is hereby incorporated by reference in its entirety.

FIELD

The disclosure relates to display apparatuses, and particularly to a method for displaying view history and a display apparatus.

BACKGROUND

After a display apparatus is turned on, a user can enter a video page he or she wants to watch through a home page or some applications. In order to allow the user to know which video he or she has watched previously in the display apparatus, a view history corresponding to the video is generated after the user exits the video page.

Some display apparatuses support cloud account function. After a user registers and logs in to the cloud account, the user can download applications (Apps) in the application store of the display apparatus, and can also purchase paid applications, etc. The same cloud account can be logged in and used on a plurality of devices. In practical applications, the applicant found that when the same cloud account is logged in on different devices, a device can only display the view history locally, therefore the user cannot see the view history generated when this cloud account is logged in on other devices.

SUMMARY

A display apparatus is provided, the display apparatus including: a display configured to display an image; a communicator in connection with the display and configured to have network connection with a server; a user input interface configured to receive an user input; a controller in connection with the display, the communicator and the user input interface and configured to cause the display apparatus to perform: after logging in to a cloud account on the display apparatus, in response to a command for watching a first video item on the display of the display apparatus, generating a first view history record corresponding to the first video item, wherein the first view history record includes a first preset image from the first video item and an identifier of the cloud account; sending the first view history record to a server via the communicator; inserting the first view history record into a first place of a second history information list, wherein the second history information list is stored in the display apparatus locally; in response to receiving a command for displaying a view history interface, sending a request for view history to the server, wherein the request for view history is used to instruct the server to send a first history information list corresponding to the identifier of the cloud account to the display apparatus, and the first history information list includes first view history records stored in the server and generated when the cloud account is logged in on a plurality of display devices, wherein the plurality of display devices includes the display apparatus; determining whether the first history information list is received; in response to receiving the first history information list, displaying one or more first preset images of one or more first view history records included in the received first history information list on the view history interface.

A method for displaying view history in a display apparatus is provided, the method including: after logging in to a cloud account on the display apparatus, in response to a command for watching a first video item on a display of the display apparatus, generating a first view history record corresponding to the first video item, wherein the first view history record includes a first preset image from the first video item and an identifier of the cloud account; sending the first view history record to a server; inserting the first view history record into a first place of a second history information list, wherein the second history information list is stored in the display apparatus locally; in response to receiving a command for displaying a view history interface, sending a request for view history to the server, wherein the request for view history is used to instruct the server to send a first history information list corresponding to the identifier of the cloud account to the display apparatus, and the first history information list includes first view history records stored in the server and generated when the cloud account is logged in on a plurality of display devices, wherein the plurality of display devices includes the display apparatus; determining whether the first history information list is received; in response to receiving the first history information list, displaying one or more first preset images of one or more first view history records included in the received first history information list on the view history interface.

DETAILED DESCRIPTION OF EMBODIMENTS

Figure 1:
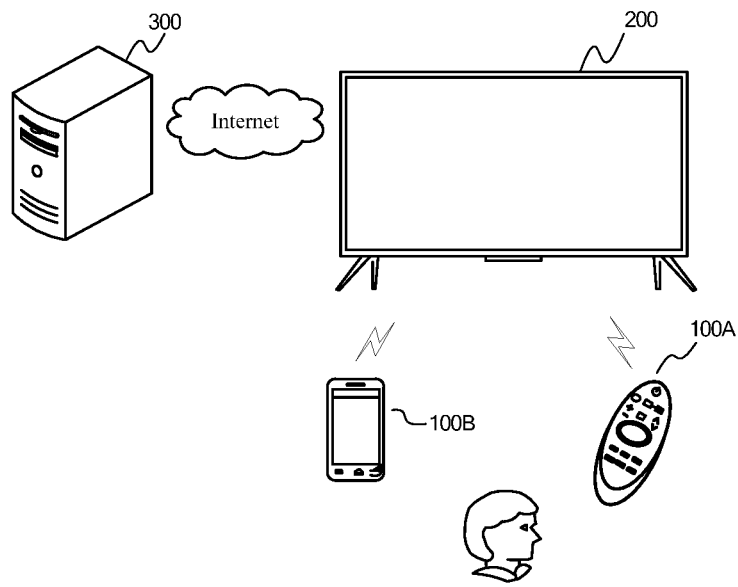
FIG. 1 is a schematic diagram of an operation scenario between a display apparatus and a control device shown in a first embodiment of the disclosure.

Implementations in embodiments of the disclosure will be described in combination with the accompanying drawings in embodiments of the disclosure. Obviously the described embodiments are only some but not all embodiments. Based upon embodiments of the disclosure, all of other embodiments obtained by those ordinary skilled in the art without creative work shall fall within to the protection scope of the disclosure.

When a display apparatus is powered on, a user can click a video item he or she wants to watch on a home page or an interface of some applications (APPs), thereby skipping to a video playing interface. A view history interface may be configured in the display apparatus, and the view history interface may display a certain number of view histories in time order. These watch histories may be arranged in rows for display, a view history may be displayed as a preset image in the video, and the preset image has a skip link, so that the user clicks one preset image when viewing the view history to directly enter the video corresponding to the preset image. Through the view history interface, it is convenient for the user to view or review the previously watched video(s).

The display apparatus described in the disclosure may be a mobile terminal such as a smart phone or a tablet computer, and the user can click on a video by manual touch or a touch pen, and switch the interface displayed on the screen; or the display apparatus may be a terminal device such as a smart TV, a laptops or a desktop computer, which can be equipped with input devices to assist the user in completing related operations. For example, the user turns on the smart TV, watches videos, switches the interface and performs other operations through a remote control; the user uses a mouse or a keyboard to complete the operations on the computer device. For some display apparatuses, a default home page can be displayed after starting the display apparatus, the pushed videos may be displayed in the home page, and the user can click the video he or she wants to watch on the home page; or the display apparatus can install some video applications, and the user clicks an application icon in an application center to start the application and watch videos in the application. The application has a personal center, through which the view history interface can be entered. This embodiment shows a system structure of a display apparatus below.

In an application scenario, after a user logs in to a cloud account on the display apparatus and enters an application to watch a video item, a view history record corresponding to this video item may be generated. This view history record is associated with the cloud account, and may be referred to as a first view history record. The first view history record needs to be synchronized to the server, and the first view history record can be stored in the server according to the cloud account. Each cloud account can correspond to a plurality of APPS, each APP has a corresponding first history information list, and the first history information list stores a first view history record generated under a certain APP after a certain cloud account is logged in.

For example, after the user logs in to a cloud account a1 and watches a video item v1 in an App1, a first view history record A is generated, and then the display apparatus sends the first view history record A to the server. After receiving the first view history record A, the server finds a first history information list listA corresponding to cloud account a1 and application App1 and then stores the first view history record Ain the first history information list listA. The first history information list listA is configured to store view history of application App1 among different devices in cloud account a1. Thus, when the user enters the view history interface in the App1, the display apparatus sends a view history request to the server, where the view history request may carry a cloud account identifier and an application identifier APP ID. After responding to the view history request, the server sends the first history information list list A to the display apparatus, and the display apparatus displays each first view history record included in the first history information list list A on the view history interface of the App1.

FIG. 1 shows a schematic diagram of an operation scenario between a display apparatus and a control device. As shown in FIG. 1, communications between the control device 100 and the display apparatus 200 may be performed in a wired or wireless manner.

Here, the control device 100 is configured to control the display apparatus 200, receive an operation command input from a user, and convert the operation command into an instruction that can be recognized and responded by the display apparatus 200.

The control device 100 may be a remote controller 100A, which includes infrared protocol communication or Bluetooth protocol communication and other short-range communication methods, etc., and controls the display apparatus 200 wirelessly or by other wired methods.

The control device 100 may also be a smart device, such as a mobile terminal 100B, a tablet computer, a computer, a notebook computer, etc.

The display apparatus 200 may provide a broadcast receiving function and a network TV function supported by a computer. The display apparatus may be implemented as digital TV, Internet TV, Internet Protocol TV (IPTV), etc.

The display apparatus 200 may be a liquid crystal display, an organic light emitting display, or a projection device.

The display apparatus 200 also performs data communication with a server 300 through various communication methods. Here, the display apparatus 200 may be allowed to perform the communication and connection through a Local Area Network (LAN), a Wireless Local Area Network (WLAN), and other networks. The server 300 may provide various contents and interactions to the display apparatus 200. For example, the display apparatus 200 may send and receive information, for example: receive the Electronic Program Guide (EPG) data, receive software updates, or access a remotely stored digital media library. The server 300 provides the video on demand, advertising service and other network service content.

Figure 2:
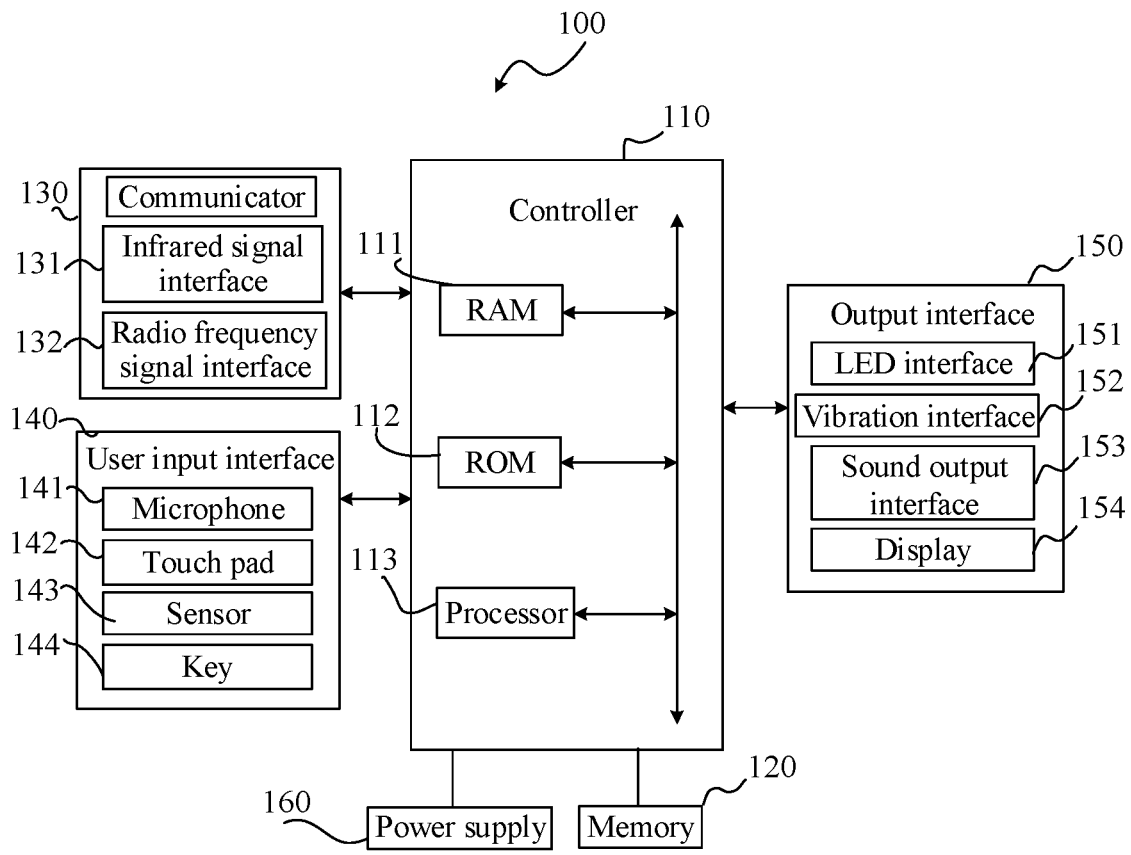
FIG. 2 is a block diagram of hardware configuration of the control device 100 in FIG. 1 shown in the first embodiment of the disclosure.

FIG. 2 shows a block diagram of configuration of the control device 100. As shown in FIG. 2, the control device 100 includes a controller 110, a memory 120, a communicator 130, a user input interface 140, an output interface 150, and a power supply 160.

The controller 110 includes a Random Access Memory (RAM) 111, a Read Only Memory (ROM) 112, a processor 113, a communication interface and a communication bus. The controller 110 is configured to control running and operations of the control device 100, and communication cooperation among internal components as well as the external and internal data processing functions.

The user input interface 140 may include at least one of a microphone 141, a touch pad 142, a sensor 143, a key 144, etc., so that the user may input user commands for controlling the display apparatus 200 to the control device 100 through voice, touch, gesture, press, etc.

The output interface 150 outputs user commands received via the user input interface 140 to the display apparatus 200, or outputs images or voice signals received by the display apparatus 200.

The power supply 160 is configured to provide power support for all the elements of the control device 100 under the control of the controller 110. The power supply may be in the form of battery and related control circuit.

Figure 3:
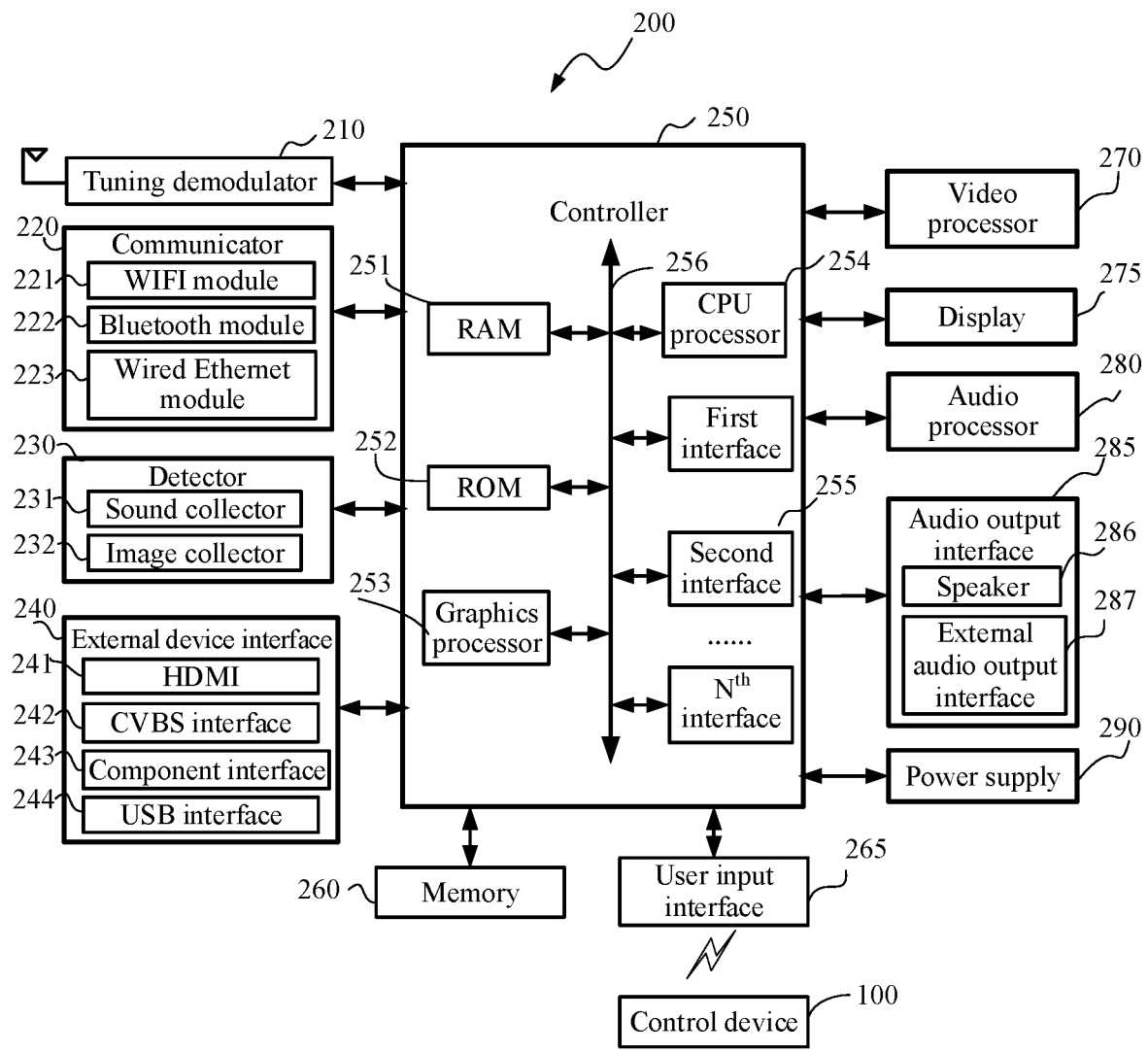
FIG. 3 is a block diagram of hardware configuration of the display apparatus 200 in FIG. 1 shown in the first embodiment of the disclosure.

FIG. 3 shows a block diagram of a hardware configuration of the display apparatus 200. As shown in FIG. 3, the display apparatus 200 may include a tuning demodulator 210, a communicator 220, a detector 230, an external device interface 240, a controller 250, a memory 260, a user input interface 265, a video processor 270, a display 275, an audio processor 280, an audio output interface 285, and a power supply 290.

The communicator 220 is a component for communicating with an external device or an external server according to various types of communication protocols. For example, the display apparatus 200 may send the content data to an external device connected via the communicator 220, or browse and download the content data from an external device connected via the communicator 220. The communicator 220 may include a WIFI module 221, a Bluetooth module 222, a wired Ethernet module 223, and other network communication protocol modules or near-field communication protocol modules, so that the communicator 220 can receive control signals from the control device 100 under the control of the controller 250 and implement the control signals as WIFI signals, Bluetooth signals, radio frequency signals, etc.

The external device interface 240 is a component that provides the controller 250 to control data transmission between the display apparatus 200 and external devices. The external device interface 240 may be connected with external devices such as a set-top box, a game device, a laptop, etc. in a wired/wireless manner, and may receive the data such as video signals (e.g., moving images), audio signals (e.g., music), additional information (e.g., EPG), etc. of the external devices.

Here, the external device interface 240 may include: any one or more of an HDMI (High Definition Multimedia Interface) 241, a CVBS (Composite Video Blanking and Sync) interface 242, a component (analog or digital) interface 243, a USB (Universal Serial Bus) interface 244, a Component interface (not shown in the figure), a Red-Green-Blue (RGB) interface (not shown in the figure), etc.

The controller 250 controls operations of the display apparatus 200 and responds to the user's operations by running various software programs (such as operating system and various applications) stored on the memory 260.

As shown in FIG. 3, the controller 250 includes an RAM (Random Access Memory) 251, an ROM (Read Only Memory) 252, a graphics processor 253, a CPU processor 254, a communication interface 255, and a communication bus 256, where the RAM 251, the ROM 252, the graphics processor 253, the CPU processor 254 and the communication interface 255 are connected through the communication bus 256.

The CPU processor 254 is configured to execute the operating system and application instructions stored in the memory 260, and process various applications, data and content according to the received user input commands, to finally display and play various audio and video contents.

The communication interface 255 may include a first interface, a second interface to an $n^{th}$ interface. These interfaces may be network interfaces connected to external devices via a network.

The controller 250 may control the overall operation of the display apparatus 200. For example, in response to receiving a user input command for selecting a GUI (Graphical User Interface) object displayed on the display 275, the controller 250 may perform operations related to the object selected by the user input command.

The memory 260 is configured to store various types of data, software programs or applications that drive and control the operations of the display apparatus 200. The memory 260 may include a transitory and/or non-transitory memory. The term "memory" includes the memory 260, the RAM 251 and ROM 252 of the controller 250, or a memory card in the display apparatus 200.

Figure 4:
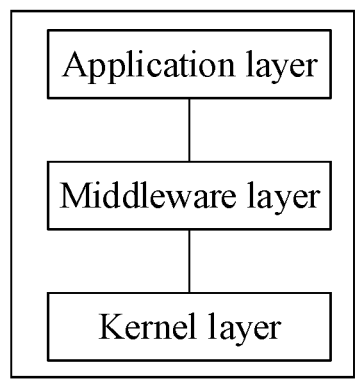
FIG. 4 is a block diagram of architecture configuration of an operating system in a memory of the display apparatus 200 shown in the first embodiment of the disclosure.

FIG. 4 shows a block diagram of architecture configuration of the operating system in the memory of the display apparatus 200. The architecture of the operating system is an application layer, a middleware layer and a kernel layer from top to bottom.

Regarding the application layer, the applications built in the system and the non-system-level applications are in the application layer. The application layer is responsible for direct interaction with users. The application layer may include a plurality of applications, such as a settings application, an electronic post application, a media center application, etc. These applications may be implemented as Web applications, which are executed based on the WebKit engine, and in particular may be developed and executed based on HTML5, Cascading Style Sheets (CSS) and JavaScript.

The middleware layer may provide some standardized interfaces to support operations of various environments and systems. For example, the middleware layer may be implemented as Multimedia and Hypermedia Experts Group (MHEG) for data broadcast-related middleware, or may be implemented as DLNA (Digital Living Network Alliance) middleware for external device communication-related middleware, or may be implemented as a middleware providing the browser environment where each application in the display apparatus runs, etc.

The kernel layer provides core system services, for example, file management, memory management, process management, network management, system security authority management, and other services. The kernel layer may be implemented as a kernel based on various operating systems, for example, a kernel based on a Linux operating system.

The kernel layer also provides communication between system software and hardware, and provides device drive services for various hardware, for example: provides a drive program for the panel, provides a camera drive program for the camera, provides a button drive program for the remote control, provides a WiFi drive program for the WIFI module, provides an audio drive program for the audio output interface, provides a power management drive for the Power Management (PM) module, etc.

Figure 5:
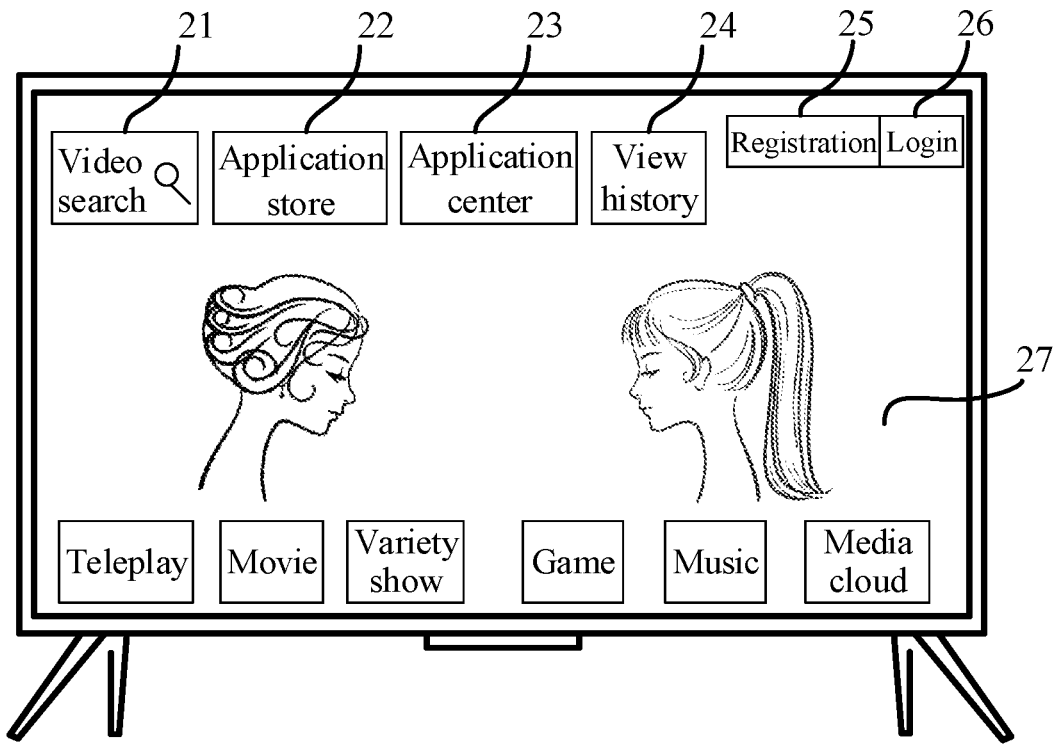
FIG. 5 is a schematic diagram of a home page of the display apparatus 200 shown in the first embodiment of the disclosure.

FIG. 5 shows a home page of the display apparatus 200. The upper portion of the home page includes controls, such as a video search 21, an application store 22, an application center 23 and a view history 24. Some recommended videos 27, such as the latest videos, etc., can be displayed in the middle of the home page. These videos are pushed to the user, to facilitate the user to quickly enter a video that may be of interest. The lower portion of the home page can include some theme sections, such as teleplay, movie, variety show, game, music, and media cloud, etc.

Figure 6:
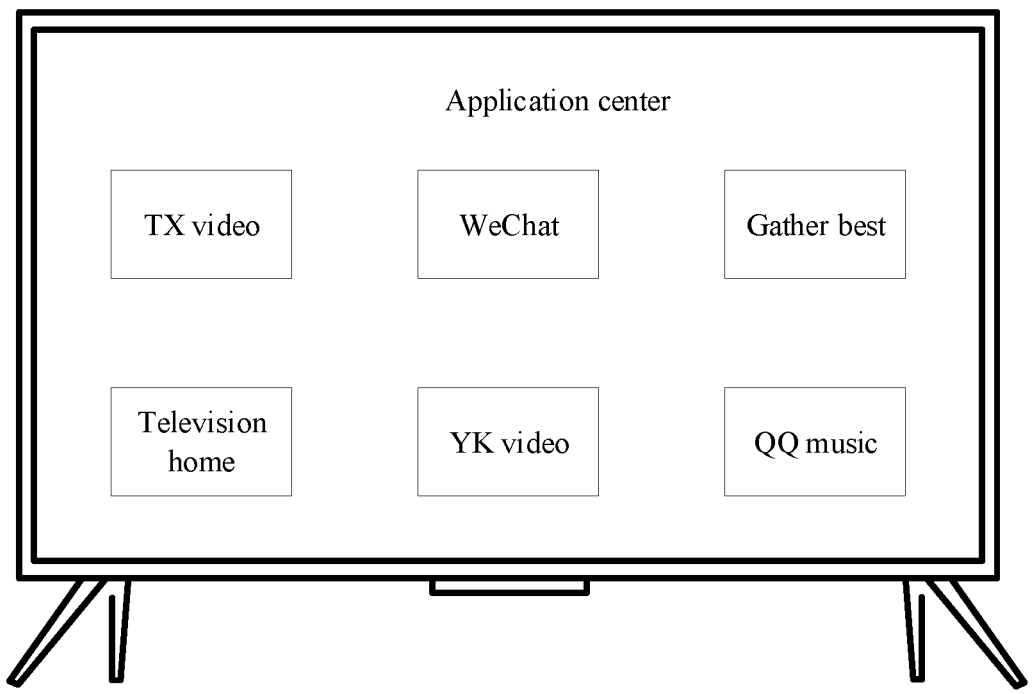
FIG. 6 is a schematic diagram of an interface of an application center shown in the first embodiment of the disclosure.

After a user clicks on the video search control 21, the user can input a name of a video he or she wants to watch through the remote control 100A or voice, to search for a target video; the user can click on the application store 22 to download and install applications in the interface of the application store 22. The user can click on the application center 23 to enter the interface of the application center as shown in FIG. 6, FIG. 6 displays application icons of all the applications installed locally, and the user can click on an application icon to start a corresponding application. The application center can include video applications, such as TX video and YK video in FIG. 6, and the user can click on the TX video or YK video to enter the APP to watch the video of interest. The user can click on the view history 24 to view a previously watched video.

For a display apparatus supporting the cloud account function, the home page may further include registration 25 and login 26 of the cloud account. When the display apparatus is in the network connection state, the user completes the registration and login of the cloud account. The cloud account described in the disclosure can be logged in and share resources on a series of terminal devices of the same brand or different brands. After the cloud account is logged in, special services such as application store 22, media cloud and onlookers can be enjoyed.

Figure 7:
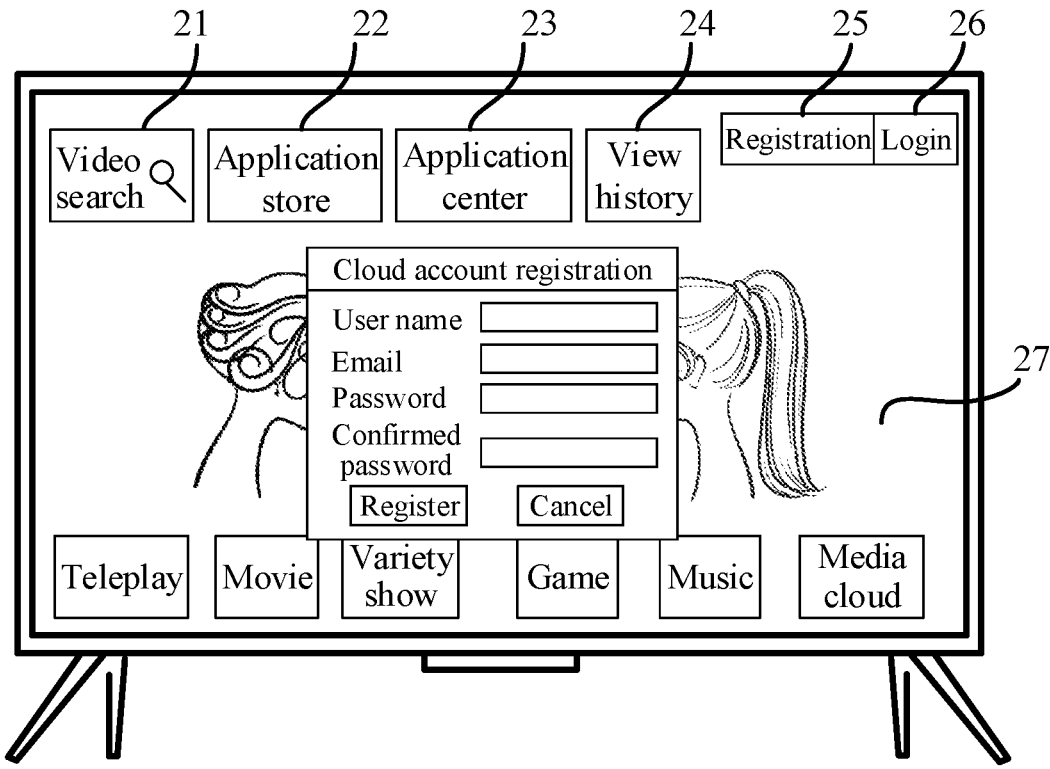
FIG. 7 is a schematic diagram of a cloud account registration window shown in the first embodiment of the disclosure.

The user can click the registration 25 on the home page, and as shown in FIG. 7, a cloud account registration window may pop up on the home page. When registering a cloud account, the user needs to fill in a user name (i.e., user ID), email address, password, confirmed password and other information, and then click "Register". If the user wants to exit the registration process, the user can click "Cancel" option.

Figure 8:
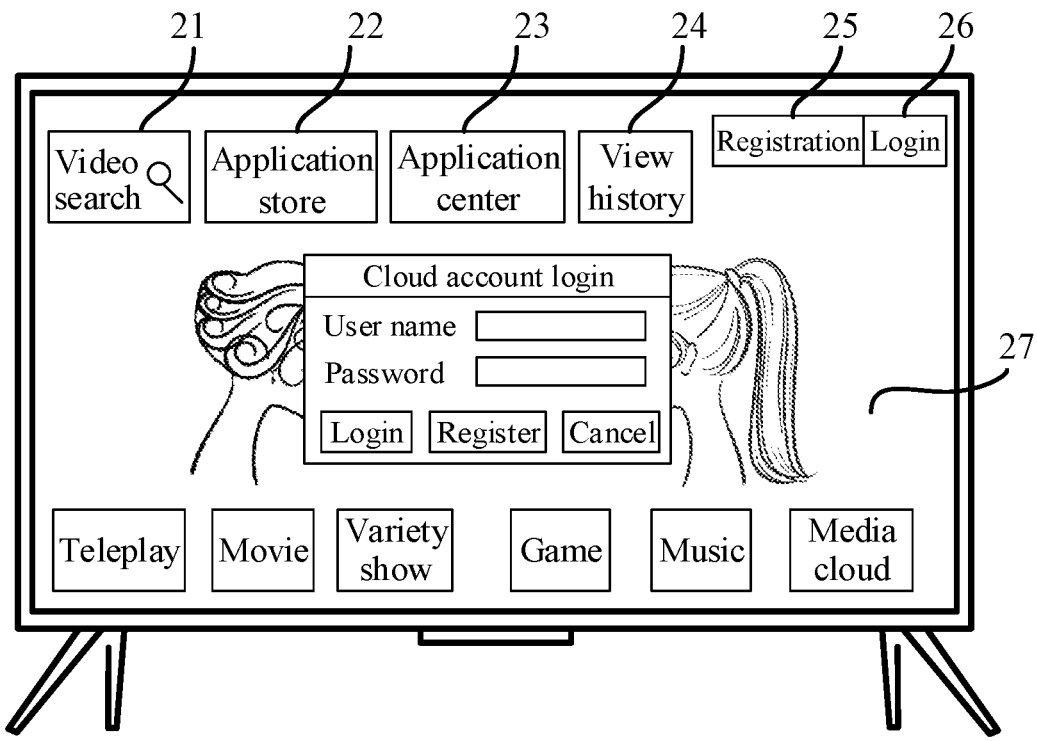
FIG. 8 is a schematic diagram of a cloud account login window shown in the first embodiment of the disclosure.

After the registration of the cloud account is completed, login of the cloud account can be performed. The user can select the item for login 26 on the home page, and as shown in FIG. 8, a cloud account login window can pop up on the home page. When logging in to the cloud account, the user needs to fill in the user name and password, and then click "Login". If the user has entered the login of a cloud account without registering the cloud account, the user can select "Register" on the login window to enter the cloud account registration process. If the user wants to exit the login process, the user can click "Cancel" option.

It should be noted that the registration and login of the cloud account can be performed without entering the home page, and can be automatically popped up when the user needs to log in to the account to enjoy services. For example, when the user clicks on the application store 22 and downloads an APP in the application store 22, the cloud account login window as shown in FIG. 8 can pop up automatically. After the user logs in to the cloud account, the user can continue to download the APP.

Figure 9:
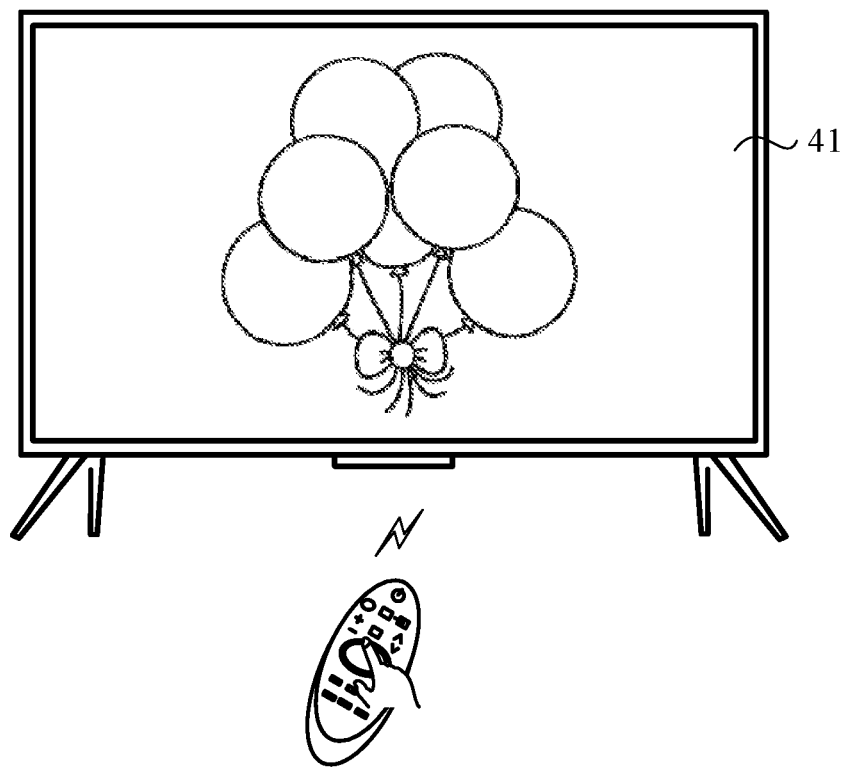
FIG. 9 is a schematic diagram of a video playing interface shown in the first embodiment of the disclosure.

After the user clicks on a video item he or she wants to watch, as shown in FIG. 9, the content displayed on the display screen may skip to the video playing interface 41. The user can watch the video content on the video playing interface 41, and can exit the video playing interface 41 at any playing progress.

Figure 10:
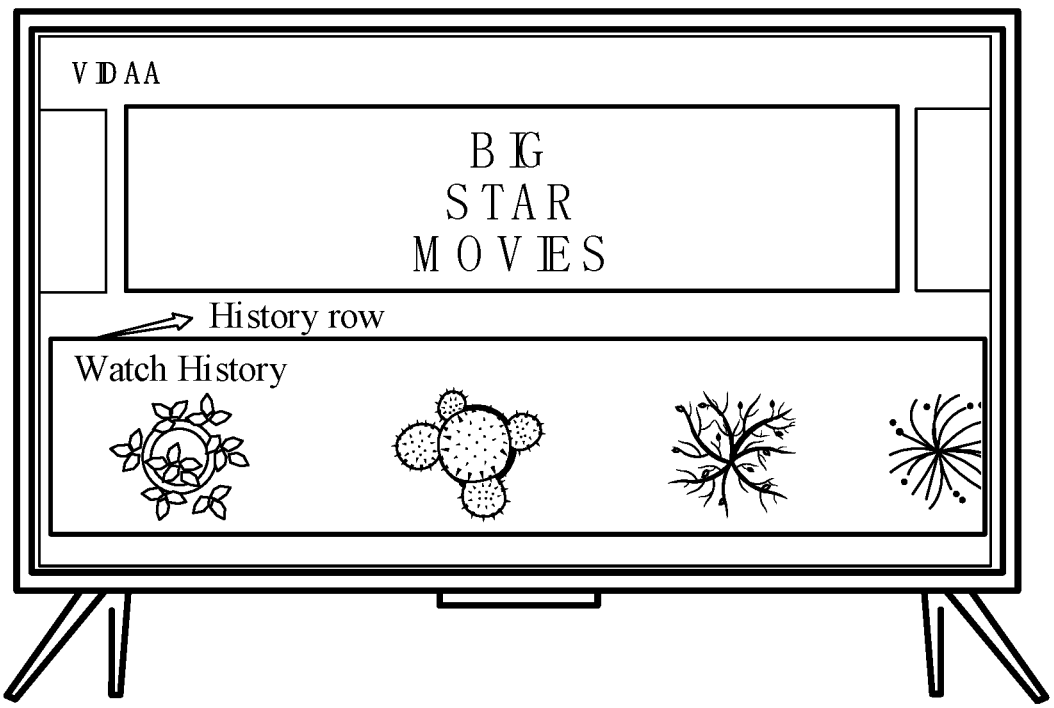
FIG. 10 is a schematic diagram of a view history interface shown in the first embodiment of the disclosure.

After the user watches a video item, a view history record corresponding to the video item needs to be inserted in the page of the view history 24. As shown in FIG. 10, the view history record of the video item of FIG. 9 is inserted into the first place on the interface of the view history 24. Here, view history records are sorted in the time order of the video items being watched, that is, when a first video is being watched first, the view history of the first video is inserted and presented on the interface of the view history, when a second video after the first video is being watched later, the view history of the second video is inserted after the view history of the first video on the interface of the view history. Of course, the sorting of view history records is not limited to the time order. In other implementations, the sorting of view items may also be set according to other factors such as playing volume and user preference. The view history records may be arranged in rows for display, such as the history row shown in FIG. 10.

The disclosure will describe how to make a display apparatus show view history records generated when a cloud account is logged in on multiple display devices, and further realize mixed display of a first view history record and a second view history record.

Figure 11:
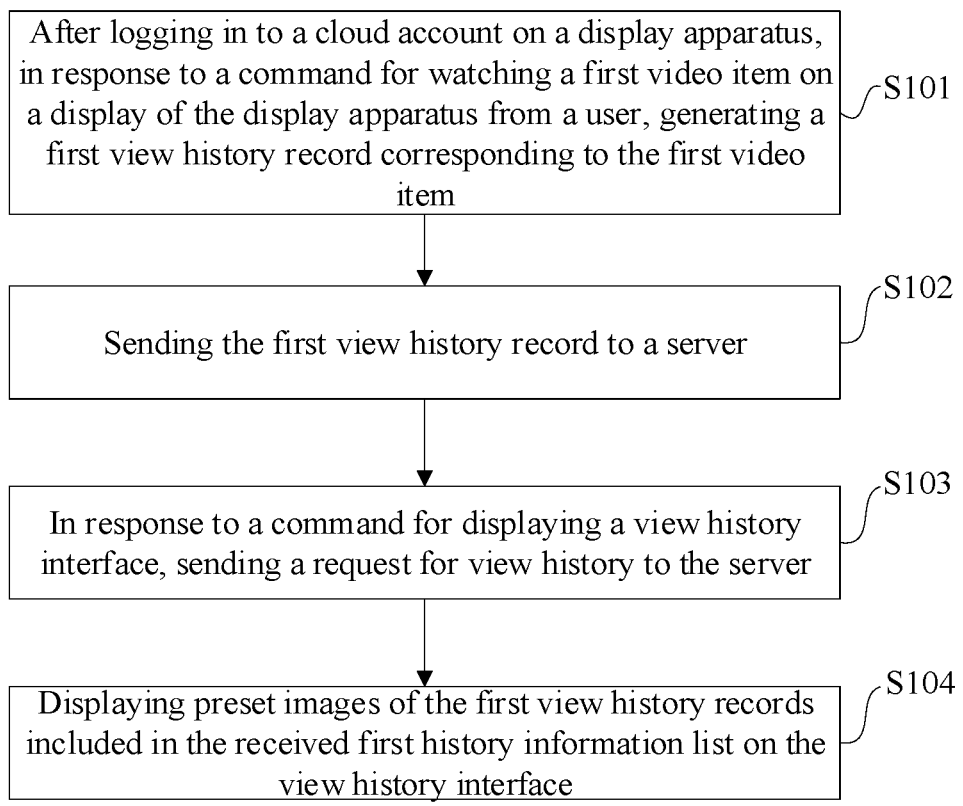
FIG. 11 is a flowchart of a method for displaying the view history performed by the display apparatus shown in a second embodiment of the disclosure.

As shown in FIG. 11, an embodiment of the disclosure provides an embodiment of a method for displaying the view history, which can be applied to the display apparatus 200. The method can be controlled by the controller 250 of the display apparatus together with related components described above.

Step S101: after logging in to a cloud account on a display apparatus, in response to a command for watching a first video item on a display of the display apparatus from a user, generating a first view history record corresponding to the first video item, where the first view history record includes a preset image and an identifier of the cloud account.

The first view history record can be expressed as:

('HistoryData_${this.userID}',JSON.stringify (this.watchHistoryData)

Here, HistoryData_${this.userID} is the variable name of the first view history record, the identifier of the cloud account is userID, the view history data carried in the first view history record is indicated in watchHistoryData, and watchHistoryData can be expressed as:

watchHistoryData: [
{
templateId: 9602,          // Display template number used by history row

```
titleName:'view history',    // Row name
userName: 'VIDAA user',      // User name, i.e., account name of cloud account
type:"2",                    // Media resource type
tilesData:[                  // Specific historical display data
dateWatched: currentUTCTime, // UTC time when user clicks to watch
   ...
]
}
]
```

The history row is the view history displayed in the form of a row; the display template number is used to indicate which template format the history row is presented; the row name is the name of the history row, that is, 'view history' is shown in the history row of the view history interface; the media resource type indicates the provider information of the video being watched; the specific historical display data includes video ID, preset image, video information, skip control, video watching duration, playing time point, and UTC time when the video item is started to be watched, etc.

The video ID is used to identify the video item corresponding to the first view history record. The preset image is an image extracted from the watched video item on the view history interface after the video item is watched, and the preset image may be displayed in the form of thumbnail.

The video information includes the video name, the number of episodes/periods/seasons of the video item, the video highlights, etc. For example, in the second episode of the third season of the program a, actor A and actor B have a good cooperation for the first time, and the video information can be displayed at the bottom of the preset image. Through presentation of the preset image and the video information, the user can learn the previously viewed video more conveniently.

The skip control can be set on a layer above the layer where the preset image locates, so that the skip control is automatically triggered when the user clicks the preset image, thereby skipping from the view history interface to the video playing interface corresponding to the preset image.

The video watching duration refers to how long the user has watched the video before exiting the video playing interface, that is, the playing progress of the previously watched video. After exiting the video playing interface, the playing progress of the first video item is recorded in the first view history record. If the user clicks a preset image when browsing the view history, the previous playing progress of the video may be loaded via the skip control, which allows the user to resume watching the remaining video content from the previous playing time point.

The playing time point is the time point at which the video is supposed to start when the user enters the video playing interface after clicking the preset image to trigger the skip control. The playing time point may be set the title portion of the video, the position after the title portion, the previous playing progress. etc.

The UTC time when the user clicks to watch the video item is a time point when the user performs the click operation on the video item. The UTC (Universal Time Coordinated) time, also known as the unified world time, and is the universal standard time. When the view history is displayed, the sorting may be performed according to the time when the user clicks to watch the video items. For example, the view history record corresponding to the later-watched video item is ranked before previously watched video item. Since the account may be logged in in different countries and regions, the use of the UTC time can ensure the accuracy of time measurement, thereby improving the accuracy in displaying the view history records in the time order. It should be noted that the naming manner of the variable name of the first view history record and the information content included in the view history data 'watchHistoryData' are not limited to those described in this embodiment.

Step S102: sending the first view history record to a server.

The server 300 can communicate and interact with a plurality of display devices 200, and the server 300 can receive first view history records generated by different cloud accounts sent from the display apparatuses 200 at any time. By backing up the first view history records generated by the display apparatuses 200 to the server 300 in the cloud, the server 300 can collect the first view history records generated by each cloud account in different display apparatuses 200 to form a first history information list corresponding to an identifier of each cloud account.

In order to reduce the storage resources consumed by the server 300, a number threshold can be preset, and it is determined per preset time whether the number of the first view history records included in the first history information list exceeds the number threshold. If the number of the first view history records included in the first history information list exceeds the number threshold, the oldest first view history records are deleted, and a newer batch of first view history records within the number threshold are retained.

Step S103: in response to a command for displaying a view history interface, sending a request for view history to the server, where the request for view history is used to instruct the server to send a first history information list corresponding to the identifier of the cloud account to the display apparatus, and the first history information list includes first view history records generated when the cloud account is logged in on a plurality of display devices.

When receiving the operation command to display the view history interface, the display apparatus needs to switch the display interface to the view history interface and then needs to determine which first view history record needs to be displayed on the view history interface. The view history request may carry the identifier of the cloud account currently logged in on the display apparatus 200. If the view history is viewed in the APP, then the view history request should also include information such as the identifier of the currently logged-in APP. When receiving the view history request, the server 300 searches for the corresponding first history information list according to the identifier of the cloud account and other information carried in the request, and sends the first history information list to the controller 250 of the display apparatus 200.

Step S104: displaying preset images of the first view history records included in the received first history information list on the view history interface.

After receiving the first history information list, the controller 250 can convert the first history information list into history rows displayed on the view history interface. Each first view history record in the first history information list is displayed by row in the history rows, which is presented as the row-by-row display of the preset image for each first view history record or the row-by-row display of the preset image and the video information (including the skip control on the preset image) for each first view history record, where the preset image is displayed in the form of thumbnail.

When delivering the first history information list, the server 300 may firstly sort the first history information list according to a certain sorting rule and then send the sorted first history information list to the controller 250; or after receiving the first history information list, the controller 250 may re-sort the first history information list according to a certain sorting rule. If the number of the first view history records included in the first history information list exceeds the number threshold which is the maximum number of view history records allowed to be displayed in the view history interface, then some first view history records in the later order may be deleted. The sorting rule includes: sorting according to the UTC time from new to old, or sorting according to the video playing frequency from high to low, etc., and the sorting rule is not limited.

Since the server 300 is wirelessly connected with many display apparatuses 200, when the same cloud account is logged in on a plurality of display devices or devices 200, each display apparatus 200 may send a first view history record generated when the cloud account is logged in to the server 300, so that the server 300 can collect the first view history records generated when the cloud account is logged in into a first history information list. When the display interface of the display is switched to the view history interface, the view history interface of the display apparatus can show the first view history records included in the first history information list, and the preset images of the first view history records are displayed on the history row, which is convenient for the user to view, so that the user can not only see the view history generated by the cloud account locally, but also see the view history generated by the cloud account when logged in on other display apparatuses, thereby learning the complete view history of the cloud account and improving user's experience.

In practical applications, if the network of the display apparatus 200 fails and thus it is impossible to communicate with the server 300, the server 300 cannot receive the request for view history information sent from the controller 250, so the display apparatus 200 cannot receive the first history information list corresponding to the currently logged in cloud account from the server 300. Alternatively, a cloud account has not yet been logged in on any display apparatus after being registered, so there is no first view history record generated when the cloud account is logged in. Thus, no first history information list corresponding to this cloud account is stored in the server 300, so the display apparatus on which this the cloud account is logged in for the first time cannot receive the first history information list from the server.

Figure 12:
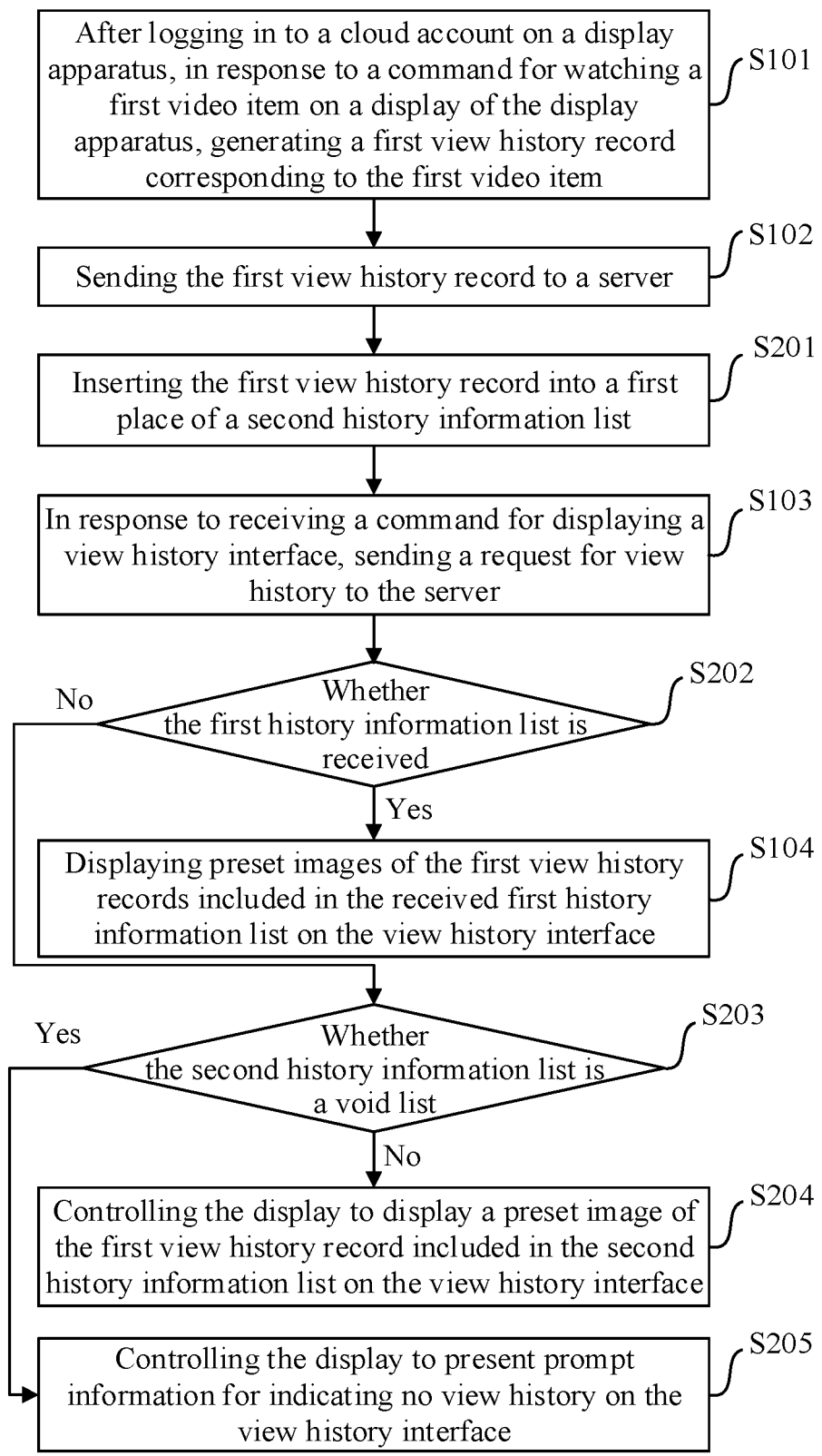
FIG. 12 is a flowchart of another method for displaying the view history performed by the display apparatus shown in the second embodiment of the disclosure.

In this regard, in order to ensure the normal display of the view history of the cloud account, on the basis of the method in FIG. 11, as shown in FIG. 12, another method for displaying the view history provided in the second embodiment is applied to the display apparatus 200. The method includes following steps.

Step S101: after logging in to a cloud account on a display apparatus, in response to a command for watching a first video item on a display of the display apparatus, generating a first view history record corresponding to the first video item, where the first view history record includes a preset image and an identifier of the cloud account.

Step S102: sending the first view history record to a server.

After the first view history record is generated, in step S201, the first view history record is inserted into a first place of a second history information list.

In this embodiment, not only the first view history record is uploaded to the server, but also the first view history record is stored in the local memory. Since a plurality of cloud accounts can be logged in on one display apparatus, each cloud account corresponds to one second history information list. The second history information list corresponding to the identifier of the cloud account can be stored in the memory 260. Each time a first view history record is generated, the first view history record is inserted into the corresponding second history information list, so that the second history information list can store the first view history generated when the cloud account is logged in locally. Each time a first view history record is generated, the first view history record is inserted into the first place of the second history information list, so that the second history information list can be automatically sorted in the order of UTC time from new to old while the second history information list is updated.

For the first history information list and the second history information list, if the same first video item has been watched by the user many times, a plurality of first view history records may be generated. However, it is desirable to only store one corresponding first view history record corresponding to the same first video item, that is, replace the old first view history record with a new one.

In a scenario where the display apparatus processes the first view history record, after a user logs in to a cloud account a1, the user watches a first video item, and a first view history record A is generated. In response to the generation of the first view history record A, an identifier of a cloud account B corresponding to the first view history record A is identified first, and whether there is a second history information list corresponding to the identifier of the cloud account B in the memory 260 will be determined.

If there is no second history information list corresponding to the identifier of the cloud account B in the memory 260, it means that the cloud account a1 is logged in in the display apparatus for the first time and the first view history record has not yet been generated, then a second history information list corresponding to the identifier of the cloud account B is created in the memory 260, and the first view history record A is directly inserted into the first place of the second history information list.

If there is a second history information list corresponding to the identifier of the cloud account B in the memory 260, the second history information list is traversed to determine whether there is a video ID corresponding to the first view history record A in the second history information list. If there is no video ID corresponding to the first view history record A in the second history information list, it means that the user did not watch the first video item when logging in to the cloud account a1 before, then the first view history record A is directly inserted into the first place of the second history information list; if there is a video ID corresponding to the first view history record A in the second history information list, it means that the user has watched the first video item when logging in to the cloud account a1 before so that a first view history record A' corresponding to this video ID was generated, then the old first view history record A' in the second history information list is deleted, and the new first view history record A is inserted into the first place of the second history information list.

Step S103: in response to receiving a command for displaying a view history interface, sending a request for view history to the server, where the request for view history is used to instruct the server to send a first history information list corresponding to the identifier of the cloud account to the display apparatus, and the first history information list includes first view history records generated when the cloud account is logged in on a plurality of display devices.

Step S202: determining whether the first history information list is received. If the first history information list is received, step S104 is executed; if the first history information list is not received, step S203 is executed.

Step S104: displaying preset images of the first view history records included in the received first history information list on the view history interface.

In response to not receiving the first history information list, in step S203, it is determined whether the second history information list is a void list.

When the user logs in to a cloud account a2 for the first time in a display apparatus, there is no second history information list corresponding to the identifier of the cloud account of the cloud account a2 in the memory 260. Then, after logging in to the cloud account a2, first, a corresponding second history information list is created in the memory 260, and then the first view history record is inserted into the second history information list based on the user's behavior of watching the video. If the second history information list is not a void list, that is, the first view history record has been inserted into the second history information list before, step S204 is executed; if the second history information list is a void list, step S205 is executed.

Step S204: controlling the display to display a preset image of the first view history record included in the second history information list on the view history interface.

The controller 250 does not receive the first history information list, and the second history information list is not a void list, meaning that the display apparatus cannot receive the first history information list sent from the server due to network failure of the display apparatus or failure to connect with the network, etc. Then, each first view history record in the second history information list can be displayed by row, which is presented as the row-by-row display of the preset image for each first view history record or the row-by-row display of the preset image and the video information (including the skip control on the preset image) for each first view history record, where the preset image is displayed in the form of thumbnail.

Figure 13:
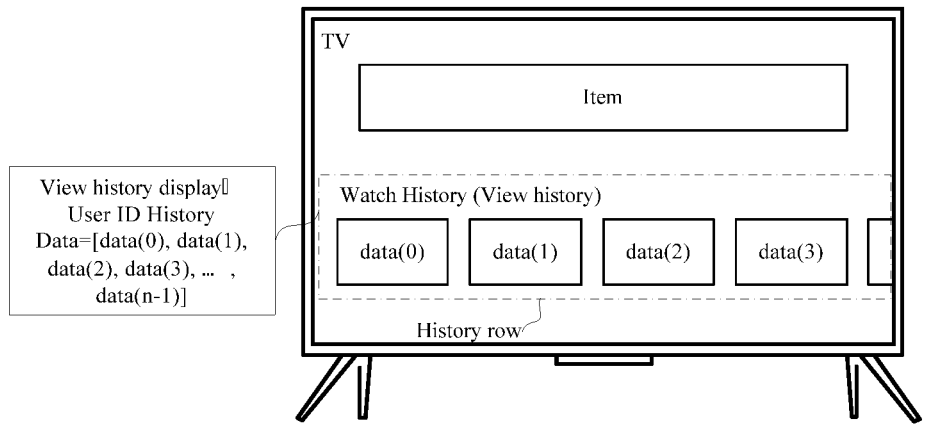
FIG. 13 is a schematic diagram of displaying a first view history record shown in the second embodiment of the disclosure.

That is, if the controller 250 receives the first history information list, the view history is displayed according to the first history information list; if the controller 250 does not receive the first history information list and the second history information list is not a void list, the view history is displayed according to the second history information list. The display of the first view history record is as shown in FIG. 13. The view history interface includes a preset Banner and a history row below the Banner, where the view history of the history row is displayed as: userID History Data= [data(0), data(1), data(2), data(3), . . . , data(n−1)], n is the number threshold, i.e., the maximum value of the display number allowed in the view history interface, data(0) to data(n−1) are first view history records displayed in sequence. Each solid-line rectangular box in the history row represents a first view history record, the solid-line rectangular box is presented as a preset image that displays the first view history record, or the solid-line rectangular box is presented as the preset image and video information of the first view history record, the preset image is provided with a skip control, and the preset image is displayed in the form of thumbnail.

Step S205: controlling the display to present prompt information for indicating no view history on the view history interface.

Figure 14A:
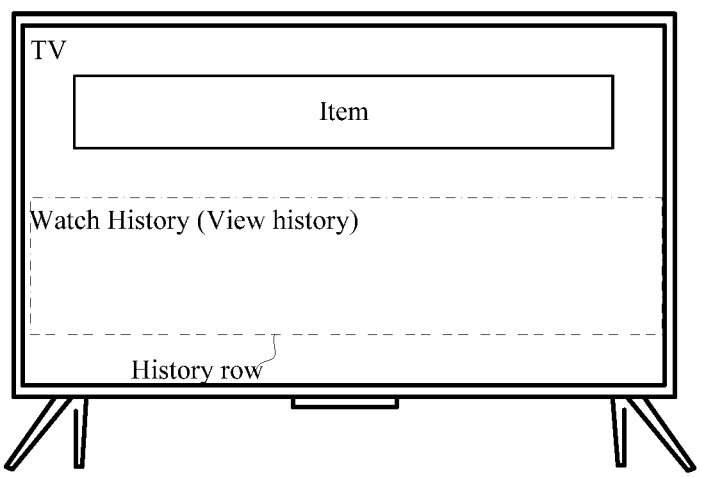
FIG. 14A is a schematic diagram of a blank display on the view history interface shown in the second embodiment of the disclosure.
Figure 14B:
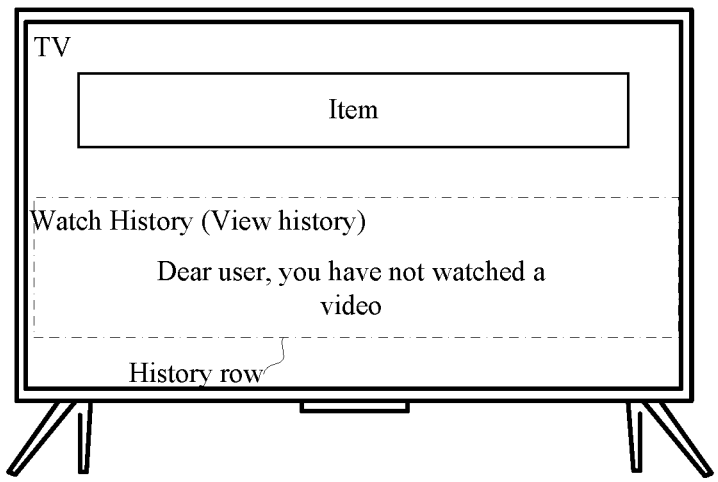
FIG. 14B is a schematic diagram of displaying prompt information of no view history on the view history interface shown in the second embodiment of the disclosure.

The controller 250 has not received the first history information list, and the second history information list is a void list, meaning that the cloud account has not been logged in on any display apparatus before, this is the first time login in the display apparatus, and the user has not watched any first video item since he or she logged in to the cloud account, so there is no first view history record. Then, the view history interface directly displays blank for indicating no view history, as shown in FIG. 14A, that is, no content related to the first view history record is displayed; or the prompt information for indicating no view history, such as "Dear user, you have not watched a video" in the area corresponding to the history row, as shown in FIG. 14B.

In some embodiments, the user can not only watch videos when logging in to a cloud account, but also watch videos when no cloud account is logged in (that is, offline state), such as some free online videos or pre-cached local videos, etc. The applicant has found that, in some scenarios, for example, a user watches a video M after turning on a display apparatus and before logging in to a cloud account, and then the user logs in to the cloud account and watches a video N after logging in to the cloud account, the user can see the first view history record of the video N but no view history record of the video M in the view history interface.

Figure 15:
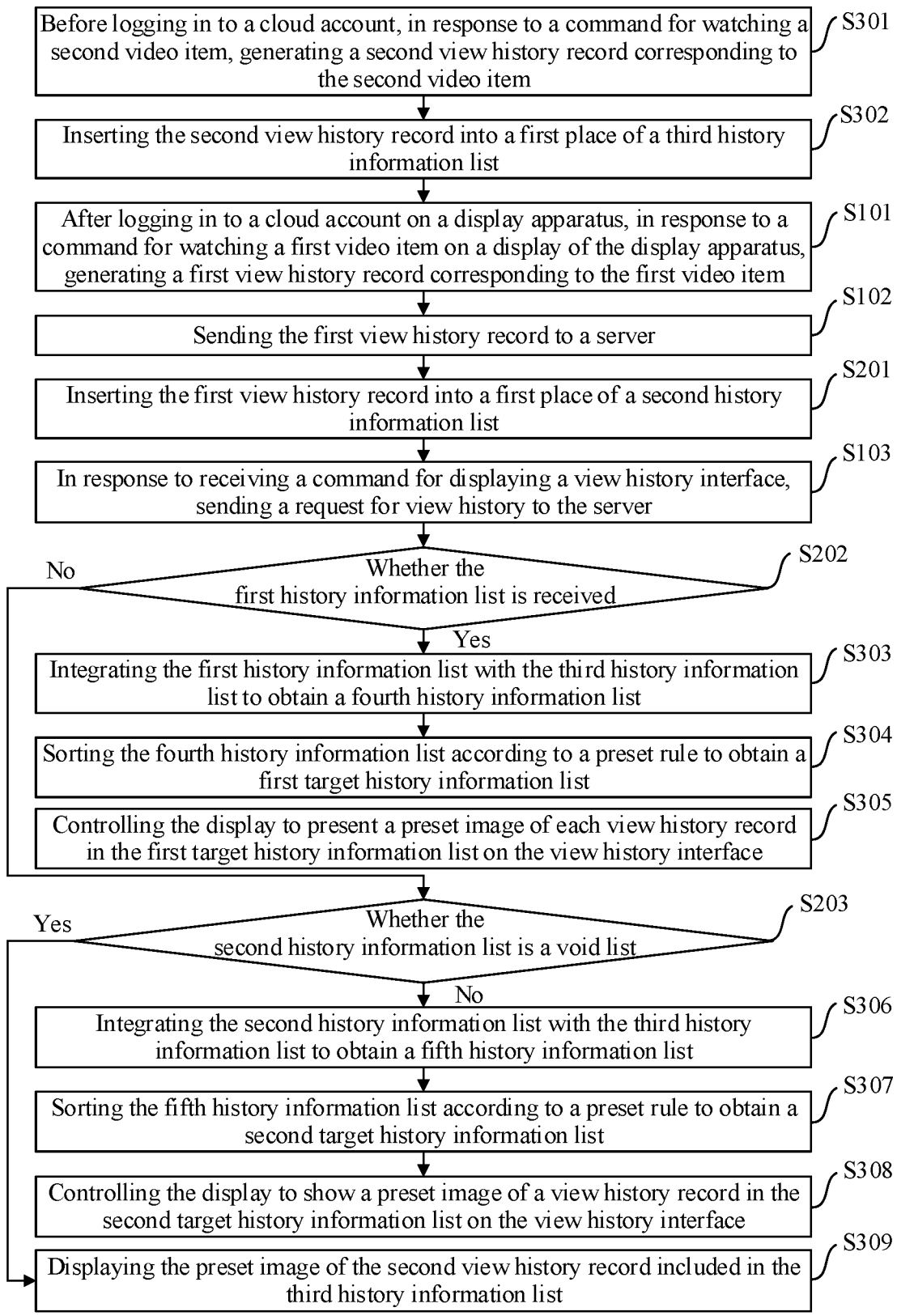
FIG. 15 is a flowchart of yet another method for displaying the view history performed by the display apparatus shown in the second embodiment of the disclosure.

In this regard, in order to realize the integrated display of the first view history record (view history associated with the cloud account) and the second view history record (offline view history), as shown in FIG. 15, yet another method for displaying the view history provided in the second embodiment of the disclosure is applied to the display apparatus 200. The method includes following steps.

Step S301: before logging in to a cloud account, in response to a command for watching a second video item, generating a second view history record corresponding to the second video item, where the second view history record includes a preset image and a local identifier.

The second view history record can be expressed as:

('localHistoryData',JSON.stringify(this.watchHistoryData)

Here, localHistoryData is the local identifier of the second view history record. Since the second view history record is a view history record generated when the cloud account is not logged in, the local identifier is unified and does not carry the identifier of the cloud account. watchHistoryData is the view history data carried in the second view history record, and watchHistoryData can be expressed as:

```
watchHistoryData: [
 {
   templateId: 9602,              // Display template number used by history row
   titleName:'view history',      // Row name
   type: "2",                     // Media resource type
   tilesData:[                    // Specific historical display data
   dateWatched: currentUTCTime,   // UTC time when user clicks to watch
      ...
   ]
 }
]
```

The data structure of the watchHistoryData of the second view history record does not include information related to the cloud account. For other information content, reference may be made to the foregoing description of the watchHistoryData of the first view history record, which will not be repeated here.

Step S302: inserting the second view history record into a first place of a third history information list.

The memory 260 also stores a third history information list, and the third history information list is used to store the second view history record generated when the user watches the second video item when the cloud account is not logged in. Each time a second view history record is generated, the second view history record is inserted into the first place of the third history information list, so that the third history information list can be automatically sorted in the order of UTC time from new to old while the third history information list is updated. The second view history record is not uploaded to the server, but is stored in the third history information list in the memory 260.

After a second view history record B is generated, the third history information list is traversed to determine whether there is a video ID corresponding to the second view history record B in the third history information list. If there is no video ID corresponding to the second view history record B in the third history information list, it means that the user did not watch the second video item when the cloud account is not logged in, then the second view history record B is directly inserted into the first place of the third history information list; if there is a video ID corresponding to the second view history record B in the third history information list and thus a second view history record B' corresponding to this video ID was generated, then the old second view history record B' in the third history information list is deleted, and the new second view history record B is inserted into the first place of the third history information list.

Step S101: after logging in to a cloud account on a display apparatus, in response to a command for watching a first video item on a display of the display apparatus, generating a first view history record corresponding to the first video item, where the first view history record includes a preset image and an identifier of the cloud account. For the data structure of the first view history record, reference may be made to the foregoing description.

Step S102: sending the first view history record to a server.

Step S201: inserting the first view history record into a first place of the second history information list.

Step S103: in response to receiving a command for displaying a view history interface, sending a request for view history to the server, where the request for view history is used to instruct the server to send a first history information list corresponding to the identifier of the cloud account to the display apparatus, and the first history information list includes first view history records generated when the cloud account is logged in on a plurality of display devices.

Step S202: determining whether the first history information list is received. If the first history information list is received, step S303 to step S305 are executed; otherwise, if the first history information list is not received, step S203 is executed.

Step S303: integrating the first history information list with the third history information list to obtain a fourth history information list.

Through the step S303, the view history associated with the cloud account issued from the server is integrated with the offline view history before the cloud account is logged in, to present the history row combining the first and third history information list, so that the display of the view history is more consistent with the actual watch behaviors of the user, improving the user experience.

Step S304: sorting the fourth history information list according to a preset rule to obtain a first target history information list.

The fourth history information list can be sorted in the order of the UTC time from the new to the old based on the UTC time corresponding to each view history record (including the first view history record and the second view history record) in the fourth history information list, to obtain the first target history information list. If the number of view history records in the first target history information list exceeds the number threshold, which is the maximum number of view history records which can be displayed in the view history interface, some view history records sorted later in the first target history information list can be deleted.

Step S305: controlling the display to present a preset image of each view history record in the first target history information list on the view history interface. The preset images of the view history records, or the preset images and the video information of the view history records in the first target history information list are displayed in sequence, where the preset images are provided with skip controls, and the preset images are displayed in the form of thumbnails.

In response to not receiving the first history information list, it is determined whether the second history information list is a void list in step S203. If the second history information list is not a void list, that is, the first view history record has been inserted into the second history information list before, steps S306 to S308 is executed; otherwise, if the second history information list is a void list, step S309 is executed.

Step S306: integrating the second history information list with the third history information list to obtain a fifth history information list.

The first history information list sent from the server is not received, and the second history information list is not a void list, meaning that this may be due to network connection failure between the display apparatus and the server. In this case, the view history associated with the account stored in the memory 260 is combined with the offline view history before the cloud account is logged in, to show the history rows in combined manner, so that the display of the view history is more consistent with the actual watch behaviors of the user, improving user's experience.

Step S307: sorting the fifth history information list according to a preset rule to obtain a second target history information list.

The fifth history information list can be sorted in the order of the UTC time from the new to the old based on the UTC time corresponding to each view history record (including the first view history record and the second view history record) in the fifth history information list, to obtain the second target history information list. If the number of view history records in the second target history information list exceeds the number threshold, which is the maximum number of view history records which can be displayed on the view history interface, some view history records sorted later in the second target history information list can be deleted. It should be noted that the sorting rule described in embodiments of the disclosure is not limited to sorting based on the UTC time.

Step S308: controlling the display to show a preset image of a view history record in the second target history information list on the view history interface.

Figure 16:
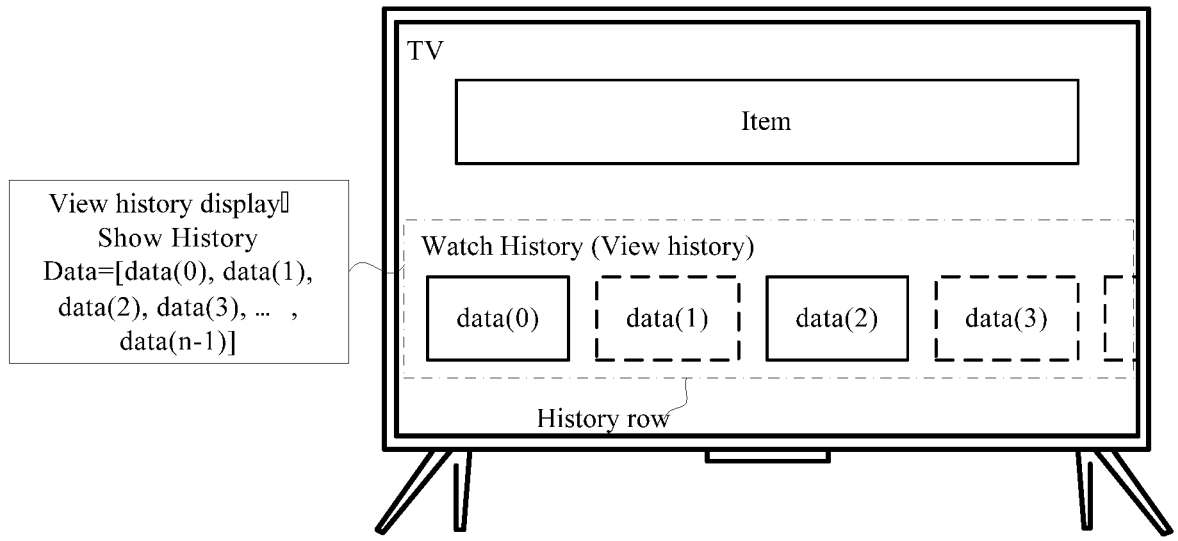
FIG. 16 is a schematic diagram of a mixed display of the offline view history and the view history associated with a cloud account shown in the second embodiment of the disclosure.

Based on the first target history information list and the second target history information list, the integrated display of the offline view history and the view history associated with the cloud account can be realized. The display effect is as shown in FIG. 16, where the view history of the history row is displayed as: Show History Data=[data(0), data(1), data(2), data(3), . . . , data(n−1)], n is the number threshold, i.e., the maximum value of the display number allowed in the view history interface, and data(0) to data(n−1) are view history records displayed in sequence. Here, a solid-line rectangular box in the history row represents a first view history record, the solid-line rectangular box is presented as a preset image that displays the first view history record or as the preset image and video information of the first view history record, the preset image is provided with a skip control, and the preset image is displayed in the form of thumbnail; and a dotted-line rectangular box in the history row represents a second view history record, the dotted-line rectangular box is presented as a preset image that displays the second view history record or as the preset image and video information of the second view history record, the preset image is provided with a skip control, and the preset image is displayed in the form of thumbnail.

Step S309: displaying the preset image of the second view history record included in the third history information list.

Figure 17:
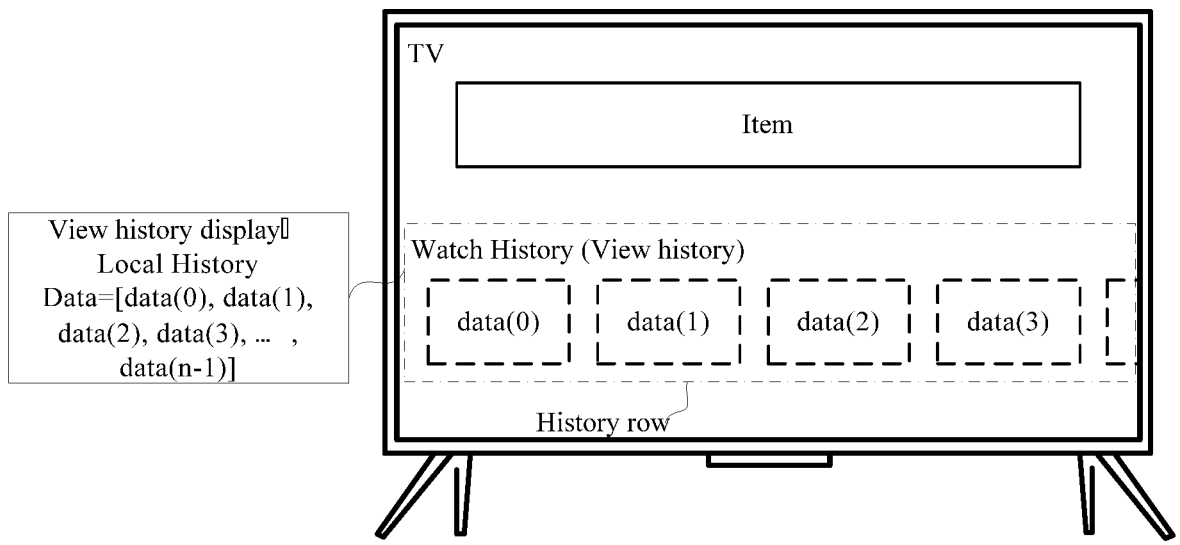
FIG. 17 is a schematic diagram of displaying a second view history record shown in the second embodiment of the disclosure.

In response to not receiving the first history information list issued from the server, and the second history information list is a void list, meaning that the currently logged in cloud account has not been logged in on the display apparatus before, and the user has not watched any first video item after logging in to the cloud account for the first time, that is, the cloud account has no associated first view history record. At this time, it is necessary to display the second view history record generated before the cloud account is logged in on the view history interface. As shown in FIG. 17, the view history of the history row is displayed as: Local History Data=[data(0), data(1), data(2), data(3), . . . , data(n−1)], n is the number threshold, i.e., the maximum value of the display number which can be shown in the view history interface, data(0) to data(n−1) are second view history records displayed in sequence, the dotted-line rectangular box in the history row represents a second view history record, the dotted-line rectangular box is implemented as a preset image that shows the second view history record or as the preset image and video information of the second view history record, the preset image is provided with a skip control, and the preset image is displayed in the form of thumbnail.

Figure 18:
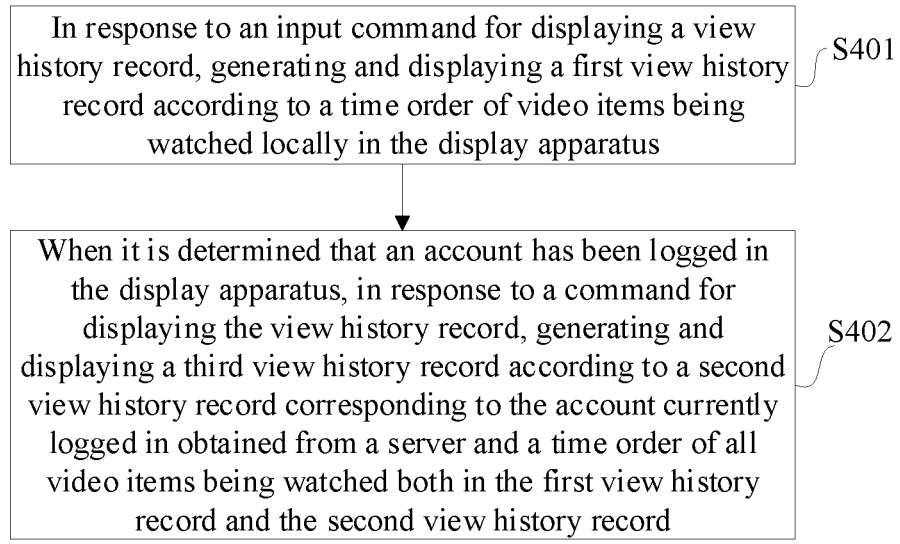
FIG. 18 is a flowchart of a method for displaying the view history performed by the display apparatus shown in a third embodiment of the disclosure.

As shown in FIG. 18, a third embodiment of the disclosure provides a method for displaying the view history, including following steps.

Step S401: in response to an input command for displaying a view history record, generating and displaying a first view history record according to a time order of video items being watched locally in the display apparatus.

In the third embodiment shown in FIG. 18, the first view history record is a view history record generated when the user watches a video item before the cloud account is logged in. When the cloud account is not logged in, if there is no first view history record, then the view history interface is blank or displays the prompt information of indicating no view history. The time order in which video items are watched refers to the UTC time order.

Step S402: when it is determined that an account has been logged in the display apparatus, in response to a command for displaying the view history record, generating and displaying a third view history record according to a second view history record corresponding to the account currently logged in obtained from a server and a time order of all video items being watched both in the first view history record and the second view history record.

Here, when it is determined that the cloud account has been logged in and the display apparatus receives a command for displaying the view history interface from a user, the display apparatus can send a request for view history to the server, where the request for view history may at least include an identifier of the account currently logged in the display apparatus. In response to the request for view history, the server sends the second view history record corresponding to the account currently logged in to the display apparatus. The second view history record described in this embodiment is a view history record generated by the video items being watched when the account currently logged in locally on the display apparatus is logged in on a plurality of display devices including the display apparatus sent the request. By combining the first view history record with the second view history record, generating the third view history record according to the time order of the video items being watched, and displaying the third view history record on the view history interface, the view history associated with the cloud account and the offline view history are combined and displayed in a mixed manner.

In some embodiments, the method further includes: in response to an input command for watching a first video item on the display apparatus, and when it is determined that the history record corresponding to the first video item is not in the third view history record, inserting a history record corresponding to the first video item into a first place in the third view history record. In some embodiments, the method further includes: in response to an input command for watching a first video item on the display apparatus, when it is determined that a history record corresponding to the first video item has already been in the third view history record, deleting the history record corresponding to the first video item that has already been in the third view history record and inserting a new history record corresponding to the first video item associated with current time of the display apparatus into a first place in the third view history record.

That is, for a video item that has been watched, when the video item is watched again after the cloud account is logged in, the old view history record is deleted from the history record, and the newly-generated view history record is inserted into the first place of the third view history record. For a video item that has not been watched, no corresponding view history record exists in the third view history record, and the video item can be directly inserted into the first place of the third view history record. In this way, the view history record corresponding to the same video item can be prevented from being repeatedly saved, and the third view history is updated during the video watching process of the user.

The time order of the video items being watched refers to the UTC time order, and the number of view history records included in the third view history record is kept within the number threshold. If the number exceeds the number threshold, some view history records with the older UTC time in the third view history record may be deleted. In an implementation, the method further includes: sending the third view history record to the server, thereby synchronizing the view history record generated locally with the server.

The view history record is displayed as a thumbnail of the watched video item. For example, a certain image may be taken from the video as a preset image, and then the preset image is presented in the form of a thumbnail. Furthermore, the video information is displayed below the thumbnail, and a skip control associated with the thumbnail is set for directing a user to the video corresponding to the thumbnail. When the user clicks on the thumbnail of the view history record, the skip control is triggered, and the video playing interface corresponding to the video item is presented as a response to a selection of the skip control.

Embodiments of the disclosure and the accompanying drawings show the form of displaying view history records by row (history row). By swiping left or right, the view history records in the history row can be scrolled. It should be noted that the display apparatus is not limited to the display form of the history row when displaying the view history records. For example, presentation in the form of grid or column, etc. can be used.

In the disclosure, the browser may be used to start an application and watch a video item via the form of webpage. The second history information list for storing the first view history record and the third history information list for storing the second view history record may be stored locally in the browser's cache (local storage). This storage manner can improve the privacy and security of the user's view history.

Figure 19:
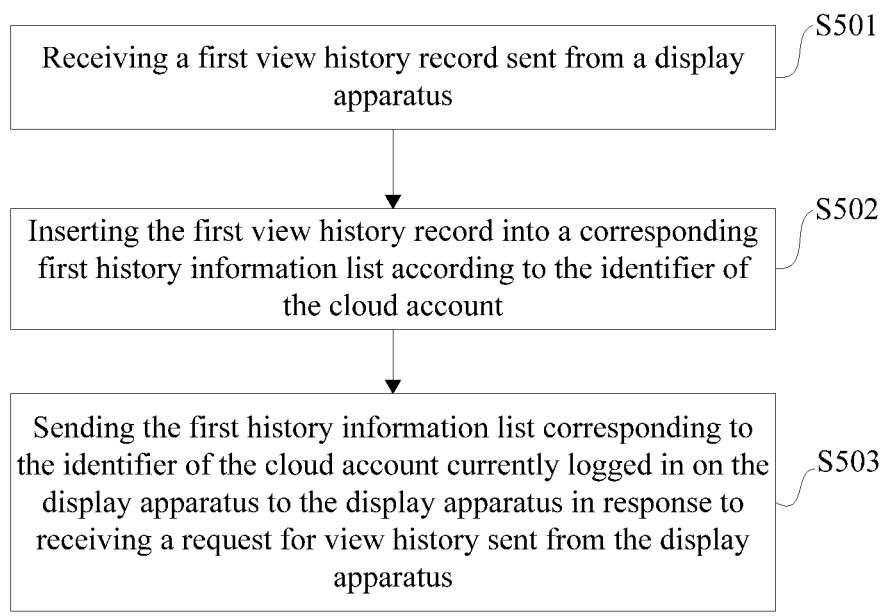
FIG. 19 is a flowchart of a method for displaying the view history performed by a server shown in a fourth embodiment of the disclosure.

As shown in FIG. 19, a fourth embodiment of the disclosure provides a method for displaying the view history from the server 300 side, including following steps.

Step S501: receiving a first view history record sent from a display apparatus, where the first view history record includes a preset image and an identifier of the cloud account.

Step S502: inserting the first view history record into a corresponding first history information list according to the identifier of the cloud account.

Since the server is connected with a plurality of display devices, the server can receive first view history records generated by different display apparatuses and different cloud accounts. Therefore, when a first view history record is received, the identifier of the cloud account corresponding to the first view history record is obtained firstly, and then the first view history record is inserted into the first history information list corresponding to the same cloud account identifier, so that the first view history records generated when the same cloud account is logged in on the plurality of display apparatuses can be collected. If the first view history record is generated by watching a first video item after logging in to an APP, the first view history record may also include an APP identifier, so that the server can find the first history information list corresponding to the first view history record of the first video item according to the identifier of the cloud account and the APP identifier.

Step S503: sending the first history information list corresponding to the identifier of the cloud account currently logged in on the display apparatus to the display apparatus in response to receiving a request for view history sent from the display apparatus.

The view history request may carry a cloud account identifier to indicate which cloud account is currently logged in on the display apparatus that sends the request for view history. The server sends the first history information list according to the identifier of the cloud account, so that the display apparatus can display the first view history records generated when the cloud account is logged in on a plurality of display devices. Thus, the user can not only see the view history generated by the cloud account locally, but also see the view history generated by the cloud account when logged in on other display apparatuses, thereby learning the complete view history of the cloud account and improving the user experience. If the user views the view history in the APP, the view history request may also carry the APP identifier. The server can find all the first view history records of the current cloud account under the currently-logged in APP state according to the identifier of the cloud account and the APP identifier.

Furthermore, the server may also sort the first history information list, for example, according to the UTC time, so that the first view history record of the most recently-watched video is ranked first. The display apparatus receives the sorted first history information list. The server may also limit the number of first view history records stored in the first history information list according to a preset number threshold. When the number of first view history records stored in the first history information list exceeds the number threshold, some first view history records ranked later are deleted, thereby reducing the consumption of storage resources.

The disclosure further shows a server, including a communicator, a memory and a controller. Components in the server are as follows.

The communicator is configured to perform wireless connections with a plurality of display devices.

The memory is configured to store first history information lists, and each cloud account corresponds to one of the first history information lists.

The controller is in connection with the communicator and the memory, and is configured to: receive a first view history record sent from one or more display apparatus, where the first view history record includes a preset image and an identifier of a cloud account; insert the first view history record into a corresponding first history information list according to the identifier of the cloud account; send the first history information list corresponding to the identifier of the cloud account of the cloud account currently logged in on the display apparatus to the display apparatus in response to receiving a view history request sent from the display apparatus.

It should be noted that the hardware and functional configuration of the server are not limited to those described in this embodiment.

In the above embodiments, after the local view history is displayed, and when the user wishes to watch the view history of his cloud account on other display apparatuses, the user can log in to the cloud account. Then, after determining that the account login operation is done, the display apparatus displays the view history of the account in all display apparatuses based on the view history corresponding to the account returned from the server and the local view history, thereby allowing the user to understand the complete view history of his or her cloud account and improving the user experience.

In the above embodiments, after logging in to the cloud account, the user clicks on the first video item he or she wants to watch, where the first video item refers to a video item watched in the cloud account login state. Then the display apparatus skips to the video playing interface as a response to a selection of the first video item, and then a first view history record corresponding to the first video item is generated, where the first view history record includes at least a preset image and an identifier of a cloud account. Then, the first view history record is sent to the server. Since the server is wirelessly connected with many display apparatuses, each display apparatus may send the first view history record generated when the cloud account is logged in to the server when the same cloud account is logged in on a plurality of display devices, so that the server side can collect all the first view history records generated when the cloud account is logged in into a first history information list.

When the display apparatus receives a command for displaying the view history interface, the view history records generated by the current cloud account need to be displayed on the view history interface. At this time, the display apparatus sends a request for view history to the server, and the server sends the first history information list to the display apparatus in response to the request for view history. Then, the view history interface of the display apparatus can display the first view history records included in the first history information list, so that the user can not only see the view history generated by the cloud account locally, but also see the view history generated by the cloud account when logged in on other display apparatuses, thereby learning the complete view history of the cloud account and improving the user experience.

The foregoing embodiments are provided for purpose of illustration and description, and are not intended to limit the disclosure. Individual elements or features in a specific embodiment are generally not limited to this specific embodiment, but, where applicable, may be used or interchanged in other embodiments even if not shown or described. Likewise, there are many variations without departing from the scope of the appended claims of the disclosure, and all such modifications shall fall within the scope of the appended claims of the disclosure.

What is claimed is:

1. A display apparatus, comprising:
   a display configured to display an image;
   a communicator in connection with the display and configured to have network connection with a server;
   a user input interface configured to receive an user input;
   a controller in connection with the display, the communicator and the user input interface and configured to cause the display apparatus to perform:
   after logging in to a cloud account on the display apparatus, in response to a command for watching a first video item on the display of the display apparatus, generating a first view history record corresponding to the first video item, wherein the first view history record comprises a first preset image from the first video item and an identifier of the cloud account;
   sending the first view history record to a server via the communicator;
   inserting the first view history record into a first place of a second history information list, wherein the second history information list is stored in the display apparatus locally;
   in response to receiving a command for displaying a view history interface, sending a request for view history to the server, wherein the request for view history is used to instruct the server to send a first history information list corresponding to the identifier of the cloud account to the display apparatus, and the first history information list comprises first view history records stored in the server and generated when the cloud account is logged in on a plurality of display devices, wherein the plurality of display devices comprises the display apparatus;
   determining whether the first history information list is received;
   in response to receiving the first history information list, displaying one or more first preset images of one or more first view history records comprised in the received first history information list on the view history interface.

2. The display apparatus according to claim 1, wherein the controller is further configured to cause the display apparatus to perform:
   in response to not receiving the first history information list, determining whether the second history information list stored locally is a void list.

3. The display apparatus according to claim 2, wherein the controller is further configured to cause the display apparatus to perform:
   in response to determining that the second history information list is not a void list, controlling the display to present one or more first preset images of one or more first view history records comprised in the second history information list on the view history interface.

4. The display apparatus according to claim 2, wherein the controller is further configured to cause the display apparatus to perform:
   in response to determining that the second history information list is a void list, controlling the display to present prompt information for indicating no view history on the view history interface.

5. The display apparatus according to claim 2, wherein the controller is further configured to cause the display apparatus to perform:
   before logging in to the cloud account, in response to a command for watching a second video item, generating a second view history record corresponding to the second video item, wherein the second view history record comprises a second preset image from the second video item and a local identifier.

6. The display apparatus according to claim 5, wherein the controller is further configured to cause the display apparatus to perform:
   inserting the second view history record into a first place of a third history information list stored in the display apparatus locally.

7. The display apparatus according to claim 6, wherein the controller is further configured to cause the display apparatus to perform:
  in response to receiving the first history information list, integrating the first history information list with the third history information list to obtain a fourth history information list;
  sorting the fourth history information list according to a preset rule to obtain a first target history information list;
  controlling the display to display preset images of view history records in the first target history information list on the view history interface.

8. The display apparatus according to claim 6, wherein the controller is further configured to cause the display apparatus to perform:
  in response to determining that the second history information list is not a void list, integrating the second history information list with the third history information list to obtain a fifth history information list;
  sorting the fifth history information list according to a preset rule to obtain a second target history information list;
  controlling the display to display preset images of view history records in the second target history information list on the view history interface.

9. The display apparatus according to claim 6, wherein the controller is further configured to cause the display apparatus to perform:
  in response to determining that the second history information list is a void list, displaying one or more second preset images of one or more second view history records comprised in the third history information list.

10. A method for displaying view history in a display apparatus, comprising:
  after logging in to a cloud account on the display apparatus, in response to a command for watching a first video item on a display of the display apparatus, generating a first view history record corresponding to the first video item, wherein the first view history record comprises a first preset image from the first video item and an identifier of the cloud account;
  sending the first view history record to a server;
  inserting the first view history record into a first place of a second history information list, wherein the second history information list is stored in the display apparatus locally;
  in response to receiving a command for displaying a view history interface, sending a request for view history to the server, wherein the request for view history is used to instruct the server to send a first history information list corresponding to the identifier of the cloud account to the display apparatus, and the first history information list comprises first view history records stored in the server and generated when the cloud account is logged in on a plurality of display devices, wherein the plurality of display devices comprises the display apparatus;
  determining whether the first history information list is received;
  in response to receiving the first history information list, displaying one or more first preset images of one or more first view history records comprised in the received first history information list on the view history interface.

11. The method according to claim 10, further comprising:
  in response to not receiving the first history information list, determining whether the second history information list stored locally is a void list.

12. The method according to claim 11, further comprising:
  in response to determining that the second history information list is not a void list, controlling the display to present one or more first preset images of one or more first view history records comprised in the second history information list on the view history interface.

13. The method according to claim 11, further comprising:
  in response to determining that the second history information list is a void list, controlling the display to present prompt information for indicating no view history on the view history interface.

14. The method according to claim 11, further comprising:
  before logging in to the cloud account, in response to a command for watching a second video item, generating a second view history record corresponding to the second video item, wherein the second view history record comprises a second preset image from the second video item and a local identifier.

15. The method according to claim 14, further comprising:
  inserting the second view history record into a first place of a third history information list stored in the display apparatus locally.

16. The method according to claim 15, further comprising:
  in response to receiving the first history information list, integrating the first history information list with the third history information list to obtain a fourth history information list;
  sorting the fourth history information list according to a preset rule to obtain a first target history information list;
  controlling the display to display preset images of view history records in the first target history information list on the view history interface.

17. The method according to claim 15, further comprising:
  in response to determining that the second history information list is not a void list, integrating the second history information list with the third history information list to obtain a fifth history information list;
  sorting the fifth history information list according to a preset rule to obtain a second target history information list;
  controlling the display to display preset images of view history records in the second target history information list on the view history interface.

18. The method according to claim 15, further comprising:
  in response to determining that the second history information list is a void list, displaying one or more preset images of one or more second view history records comprised in the third history information list.

* * * * *